US012459648B2

(12) United States Patent
Chavarria Garcia et al.

(10) Patent No.: US 12,459,648 B2
(45) Date of Patent: Nov. 4, 2025

(54) KNIT AMENITIES PANEL FOR AIRCRAFT SEAT

(71) Applicant: Safran Seats USA LLC, Gainesville, TX (US)

(72) Inventors: Daniel Abraham Chavarria Garcia, Chihuahua (MX); Teresa Del Carmen Antillon Licon, Chihuahua (MX); David Morales Morales, Chihuahua (MX)

(73) Assignee: Safran Seats USA LLC, Gainesville, TX (US)

( * ) Notice: Subject to any disclaimer, the term of this patent is extended or adjusted under 35 U.S.C. 154(b) by 56 days.

(21) Appl. No.: 17/919,803

(22) PCT Filed: Apr. 30, 2020

(86) PCT No.: PCT/US2020/030816
§ 371 (c)(1),
(2) Date: Oct. 19, 2022

(87) PCT Pub. No.: WO2021/221674
PCT Pub. Date: Nov. 4, 2021

(65) Prior Publication Data
US 2023/0073857 A1    Mar. 9, 2023

(51) Int. Cl.
*B64D 11/06*    (2006.01)
*B60R 7/00*    (2006.01)

(52) U.S. Cl.
CPC .......... *B64D 11/0636* (2014.12); *B60R 7/005* (2013.01); *B64D 11/0638* (2014.12)

(58) Field of Classification Search
None
See application file for complete search history.

(56) References Cited

U.S. PATENT DOCUMENTS 9,375,045 B2    6/2016    Farris et al.
9,445,640 B2    9/2016    Dua et al.
(Continued)

FOREIGN PATENT DOCUMENTS

WO    2016140631 A1    9/2016
WO    2021086386 A1    5/2021

OTHER PUBLICATIONS

International Patent Application No. PCT/US2020/030816, International Search Report and Written Opinion, dated Jan. 25, 2021.
(Continued)

*Primary Examiner* — Timothy J Brindley
(74) *Attorney, Agent, or Firm* — Kilpatrick Townsend & Stockton LLP

(57) ABSTRACT

Described are passenger seats including a knit amenities panel, the knit amenities panel having a support structure including a cover shroud member and a backing member; and a knitted retention component comprising at least one elastic yarn, where the knitted retention component is knitted in one piece; the knitted retention component is attachable to the backing member and defines a plurality of openings; a tension force is created in the knitted retention component due to the attachment of the knitted retention component to the backing member; the tension force permits the knitted retention component to hold at least one object; and the backing member with the knitted retention component attached is coupled to the cover shroud member.

20 Claims, 10 Drawing Sheets

(56) References Cited

U.S. PATENT DOCUMENTS

| | | | | |
|---|---|---|---|---|
| 10,631,606 | B1* | 4/2020 | Thompson | A45C 11/182 |
| 2001/0039903 | A1* | 11/2001 | Patterson | B60N 3/004 |
| | | | | 108/44 |
| 2015/0108798 | A1 | 4/2015 | Pfitzner et al. | |
| 2016/0137138 | A1* | 5/2016 | Dyle | B60R 11/02 |
| | | | | 297/188.04 |
| 2017/0291710 | A1 | 10/2017 | Barr-Perea et al. | |
| 2019/0217784 | A1 | 7/2019 | Vanderpool et al. | |
| 2019/0283644 | A1 | 9/2019 | Smith et al. | |

OTHER PUBLICATIONS

Marisa Garcia, *New aircraft seatback concept supports passenger 'micro-nesting'*, https://runwaygirlnetwork.com/2020/01/12/new-aircraft-seatback-concept-suits-passenger-micro-nesting/, Apr. 14, 2020.

David J. Spencer, *Knitting technology a comprehensive handbook and practical guide*, $3^{rd}$ edition, Woodhead Publishing Limited, Cambridge, England, 2001.

\* cited by examiner

KNIT AMENITIES PANEL FOR AIRCRAFT SEAT

FIELD OF THE INVENTION

The field of the invention relates to support structures attached to passenger seats.

BACKGROUND

Inside an airplane, space is very limited and therefore valuable. Airlines aim to optimize how they use the space to ensure they meet their profit goals and to achieve the required density level in economy class. To do this, the area allocated to each seat is typically minimized to be as small as possible. Often, a passenger will bring personal items with them to be used and/or provide entertainment during the flight, but there is not always space to store those items so that they remain out of a passenger's way while being readily available for when the passenger desires to use them.

Conventionally, there are two locations in each economy class seat where the passenger can place his or her belongings. The first location is the tray table. When the tray table is deployed, the passenger may place his or her personal items on the tray table. These items are then readily available, but the space provided by the tray table may be insufficient depending on the number of personal items the passenger has or if the meal or drink service has arrived, which may result in the items needing to be relocated someplace else. Additionally, when the tray table is deployed, the surface of the tray table typically tends to be approximately horizontal to the floor, and thus there is not an appropriate surface on which to place and hold a tablet, cellphone, or other personal electronic device at an appropriate viewing orientation.

The second location where the passenger can place his or her belongings is the seat back pocket. However, this area does not always provide readily available access, e.g., if the tray table is deployed. Additionally, items can easily be forgotten when placed in the seat back pocket.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat comprises a knit amenities panel, wherein the knit amenities panel comprises a support structure comprising a cover shroud member and a backing member; and a knitted retention component comprising at least one elastic yarn, wherein: the knitted retention component is knitted in one piece; the knitted retention component is attachable to the backing member and defines a plurality of openings; a tension force is created in the knitted retention component due to the attachment of the knitted retention component to the backing member; the tension force permits the knitted retention component to hold at least one object; and the backing member with the knitted retention component attached is coupled to the cover shroud member.

In some embodiments, the cover shroud member defines an opening that permits access to the knitted retention component.

In certain embodiments, the cover shroud member is attachable to at least one of a seat frame of the passenger seat, a shroud portion of the passenger seat, or a seat back of the passenger seat.

The knitted retention component may be configured to hold the at least one object against the backing member.

The backing member, in some embodiments, comprises a plurality of protrusions and the knitted retention component is attached to the backing member using the plurality of protrusions.

At least one of the plurality of protrusions may substantially align with each of the plurality of openings to provide the tension force.

In certain embodiments, the knitted retention component comprises a plurality of edges and the plurality of protrusions extend along each of the plurality of edges.

According to certain embodiments of the present invention, a passenger seat comprises a knit amenities panel, wherein the knit amenities panel comprises: a support structure; and a knitted retention component comprising at least one elastic yarn, wherein: the knitted retention component is knitted in one piece; the knitted retention component is attachable to the support structure and defines a plurality of openings; a tension force is created in the knitted retention component due to the attachment of the knitted retention component to the support structure; and the tension force permits the knitted retention component to hold at least one object.

The support structure, in certain embodiments, defines a cavity and the knitted retention component substantially encloses the cavity.

The support structure may be attachable to at least one of a seat frame of the passenger seat, a shroud portion of the passenger seat, or a seat back of the passenger seat.

In some embodiments, the attached support structure is positioned between the knitted retention component and the seat back of the passenger seat.

In certain embodiments, the knitted retention component is configured to hold the at least one object against the support structure.

The support structure, in some embodiments, comprises a plurality of protrusions and the knitted retention component is attached to the support structure using the plurality of protrusions.

At least one of the plurality of protrusions may substantially align with at least one of the plurality of openings to provide the tension force.

According to certain embodiments of the present invention, a passenger seat comprises: a seat back; and a knit amenities panel positioned proximate to the seat back, the knit amenities panel comprising: a support structure; and a knitted retention component comprising at least one elastic yarn, wherein: the knitted retention component is knitted in one piece; the knitted retention component is attachable to the support structure and defines a plurality of openings; a tension force is created in the knitted retention component due to the attachment of the knitted retention component to the support structure; and the tension force permits the knitted retention component to hold at least one object.

The knit amenities panel may be pivotally attachable to the passenger seat.

In some embodiments, the support structure is attachable to at least one of a seat frame of the passenger seat, a shroud portion of the passenger seat, or the seat back.

The attached support structure, in certain embodiments, is positioned between the knitted retention component and the seat back of the passenger seat.

The passenger seat may further comprising a tray table deployable away from a rearward surface of the seat back, wherein the knit amenities panel is attachable to the passenger seat and positioned between the rearward surface of the seat back and the tray table when the tray table is in a stowed position.

In certain embodiments, the knitted retention component is configured to hold the at least one object against the support structure.

DETAILED DESCRIPTION

Figure 1A:
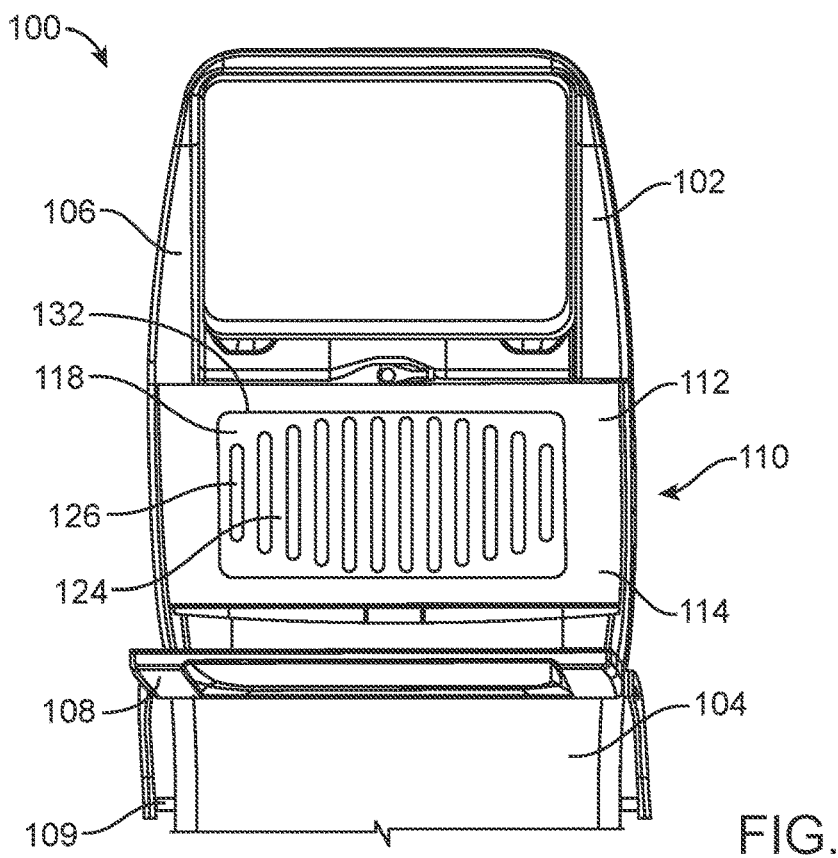
FIG. 1A is a rear view of a seat with a knit amenities panel, according to certain embodiments of the present invention.
Figure 1B:
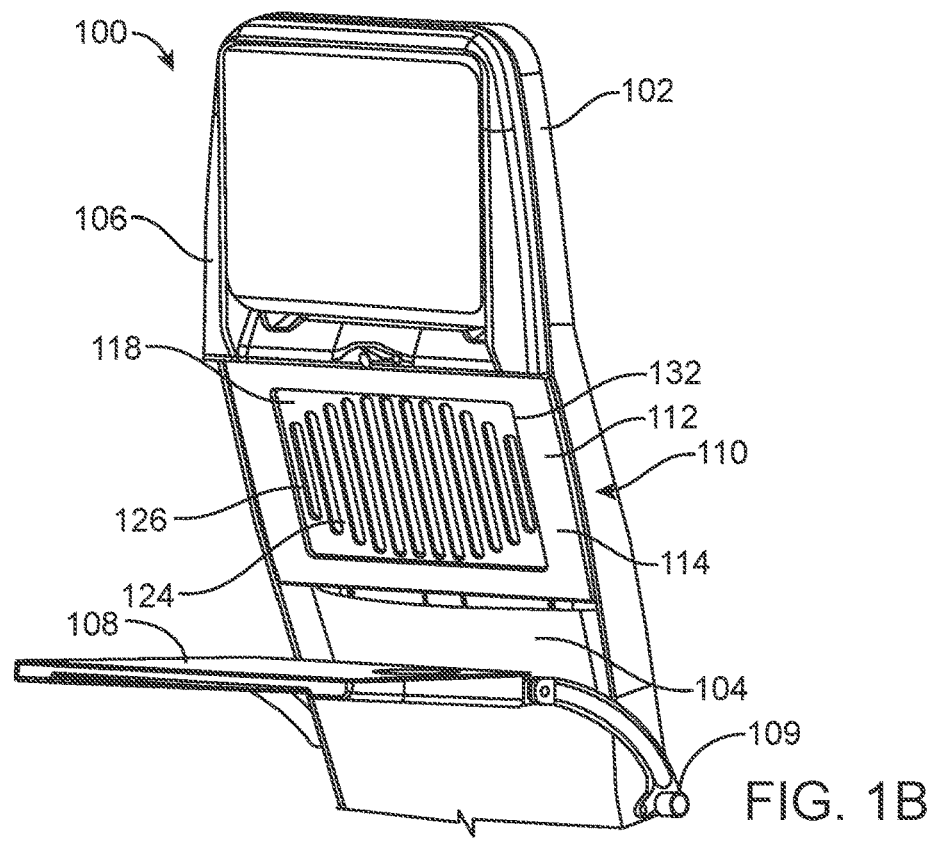
FIG. 1B is a perspective rear view of the seat of FIG. 1A.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a knit amenities panel for passenger seats. While the knit amenities panel is discussed for use with aircraft seats, it is by no means so limited. Rather, embodiments of the knit amenities panel may be used in passenger seats or other seats of any type or otherwise as desired.

According to certain embodiments of the present invention, as shown in FIGS. 1A-6, a knit amenities panel 110 comprises a support structure 112 and a knitted retention component 118. In some embodiments, the support structure 112 may comprise a cover shroud member 114 and a backing member 116. The knit amenities panel 110 is attached to a passenger seat 100. The passenger seat 100 may include at least one of a seat back 102, a rearward surface 104 of the seat back 102, a shroud portion 106, a tray table 108, and a seat frame 109. It should be understood that each of the elements and features described in reference to a particular figure may be incorporated into any of the embodiments described in this application.

In some embodiments, the knitted retention component 118 includes at least one retention portion 124 and defines at least one opening 126. The at least one retention portion 124 may be a portion of the knitted retention component 118 located proximate to the at least one opening 126 or between a plurality of openings 126. For example, the at least one retention portion 124 may be a substantially linear strip of the knitted retention component 118, though the at least one retention portion 124 may take any suitable shape. The knitted retention component 118 is attachable to the support structure 112, e.g., the knitted retention component 118 may be attached to the backing member 116. The cover shroud member 114 may attach to the backing member 116 or to both the backing member 116 and the knitted retention component 118 to form the knit amenities panel 110.

The knitted retention component 118 may be weft knit or warp knit using any suitable stitching structure and yarn. The yarn may be formed from natural materials, e.g., cotton, wool, alpaca, hemp, coconut fibers, silk, etc., from synthetic materials, e.g., nylon, polyester, elastane, spandex, aramid fibers, para-aramid fibers, etc., or from a combination of natural and synthetic materials. In some embodiments, the knitted retention component 118 may be coated with a suitable coating, e.g., polyester, polyester-urethane prepolymer, acrylate, acetate, reactive polyolefins, co-polyester, polyamide, co-polyamide, polyurethanes, thermoplastic polyurethanes, polymeric dispersions, etc. Additionally, the knitted retention component 118 may be a single-layered fabric, a multi-layered fabric, or a partially single- and multi-layered fabric. The multiple layers of the multi-layered fabric may be fully attached to one another or partially attached to one another, e.g., two layers of the multi-layered fabric may be attached only along one or more edges of the multi-layered fabric.

In some embodiments, the knitted retention component 118 is formed from a knit material that is knit in one piece. The knitted retention component 118 may be said to be formed of unitary knit construction because the knitted retention component 118 is formed as a single element during the knitting process. Additionally, the knit material of the knitted retention component 118 may be formed as three-dimensional (3D) knitwear using a 3D knitting process or using any other suitable knitting process for forming the knitted retention component 118 as a single element. The 3D knitting process forms the knitted retention component 118 as a single element and results in the knitted retention component 118 being fully constructed and formed to its final shape in a single process. The 3D knitting process may reduce the time and cost required to produce the knitted retention component 118 and may eliminate waste, e.g.

scrap material, due to the fact that the knitted retention component 118 does not have to be cut from a larger knit fabric.

In some embodiments, properties of the knitted retention component 118, e.g., appearance, stretchability (e.g., express as Young's modulus), thermoconductivity, permeability to air and water, thermal capacity, hardness, abrasion resistance, thickness, static friction, bendability, moisture absorption, etc., may be controlled by changing at least one of the stitching structure, the knitting pattern, or the material (e.g., yarn, surface coating, etc.) of the knitted retention component 118. For example, yarns made from a variety of material compositions may be used to enable customization of the functionality and properties of the knitted retention component 118. Additionally, a different stitch structure, knit pattern, or material may be selected for different areas or zones of the knitted retention component 118 so that the properties of the knit material in each area of the knitted retention component 118 is different. This may allow for additional customization of the knitted retention component 118.

The knitted retention component 118, or any other knit component incorporated into the knit amenities panel 110, can incorporate the teachings of one or more of "Knitting Technology—A Comprehensive Handbook and Practical Guide," 3$^{rd}$. ed., written by David J. Spencer; U.S. patent application Ser. No. 14/035,462 to Farris, et al., entitled "Knitted Component with Adjustable Knitted Portion," filed on Sep. 24, 2013 and published as U.S. Pat. No. 9,375,045; and U.S. patent application Ser. No. 13/400,511 to Dua, et al., entitled "Article of Footwear Incorporating a Knitted Component with a Tongue," filed on Feb. 20, 2012 and published as U.S. Pat. No. 9,445,640, each of which is hereby incorporated by reference in its entirety.

The support structure 112, the cover shroud member 114, and the backing member 116 may be formed of materials including but not limited to aluminum, stainless steel, aramid fibers, polycarbonate, polypropylene, other metallic materials, composite materials, or other similar materials. The cover shroud member 114 and the backing member 116 may be formed from the same materials, e.g., the cover shroud member 114 and the backing member 116 may both be formed from polycarbonate, or from different materials, e.g., the cover shroud member 114 may be formed from polypropylene and the backing member 116 may be formed from aluminum. The material used for the cover shroud member 114 and the backing member 116 may depend on any of the strength of the material, weight constraints of the knit amenities panel 110, or safety restrictions for the knit amenities panel 110.

In some embodiments, the cover shroud member 114, the backing member 116, and the knitted retention component 118 may be substantially shaped as a rectangle, a square, a triangle, an oval, a circle, or any other suitable shape. The cover shroud member 114, the backing member 116, and the knitted retention component 118 may each have the same shape or may have any combination of the same or different shapes. For example, the cover shroud member 114, the backing member 116, and the knitted retention component 118 may each be rectangular shaped, or the cover shroud member 114 may be rectangular shaped, the knitted retention component 118 may be circular shaped, and the backing member 116 may be square shaped.

Figure 6:
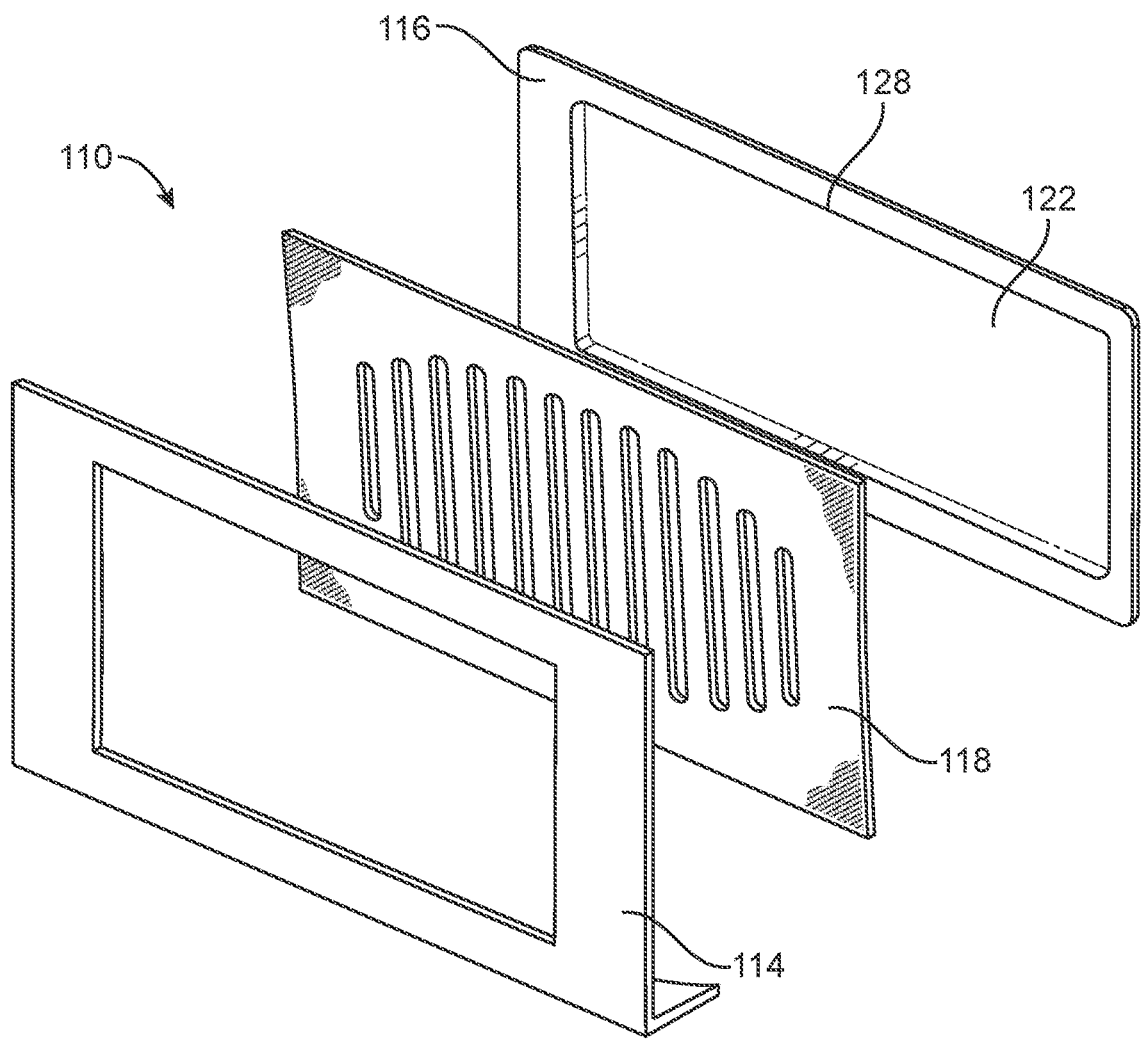
FIG. 6 is an exploded view of a knit amenities panel of a seat, according to certain embodiments of the present invention.

The backing member 116 may have a retention surface 122, e.g., a substantially planar surface, a curved surface, an uneven surface, etc. The backing member 116 may also define a cavity 128, e.g., as is best illustrated in FIG. 6, and the cavity may include the retention surface 122. The retention surface 122 may face or come into contact with the knitted retention component 118 when the knitted retention component 118 is attached to the backing member 116. In some embodiments, the attached knitted retention component 118 at least partially covers the retention surface 122. Additionally, as discussed below in reference to FIGS. 3A and 3B, at least one additional material component may be attached to the backing member 116 between the knitted retention component 118 and the retention surface 122.

In some embodiments, the backing member 116 may include at least one protrusion 120. The at least one protrusion 120 may be integrally formed with the backing member 116 or may be coupled to the backing member 116. For example, the at least one protrusion 120 may be a knob, a nail, a screw, a bolt, etc.

Figure 1C:
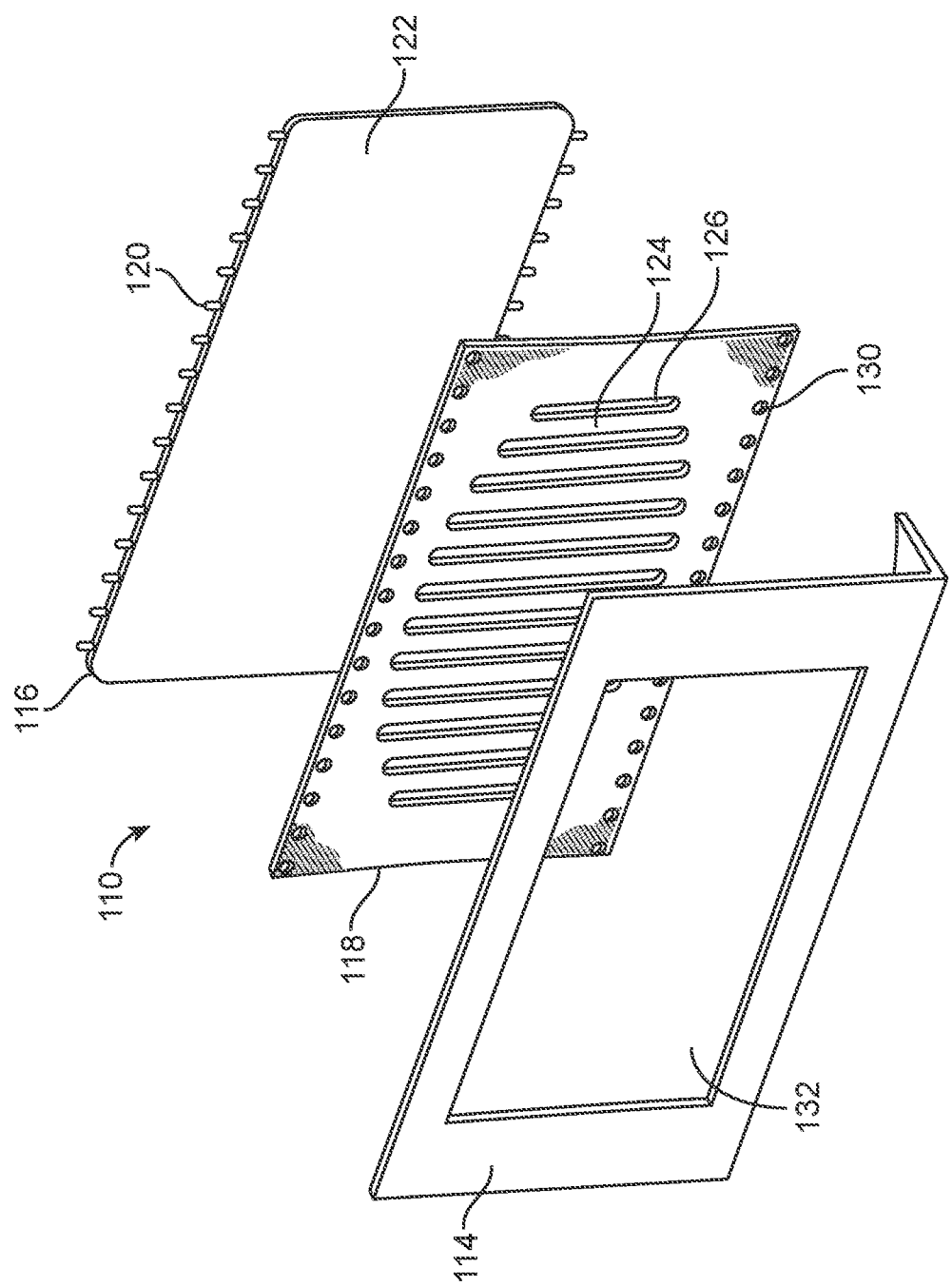
FIG. 1C is an isolated, exploded view of the knit amenities panel of the seat of FIG. 1A.

The at least one protrusion 120 may be positioned at or proximate to at least one edge of the backing member 116. For example, as best illustrated in FIG. 1C, the backing member 116 may include a plurality of protrusions 120 extending from a first edge, e.g., an upper edge, and a second edge, e.g., a lower edge, of the backing member 116. Additionally, the backing member 116 may include a plurality of protrusions 120 extending from at least one of a third edge, e.g., a right edge, or a fourth edge, e.g., a left edge. The plurality of protrusions 120 may extend along a plane parallel or substantially parallel to the plane of the retention surface 122 or may extend along a plane that intersects the plane of the retention surface 122, e.g., substantially perpendicular to the retention surface 122 as best illustrated in FIG. 3B.

In some embodiments, the knitted retention component 118 may be attached to the backing member 116 using the plurality of protrusions 120. In some embodiments, the knitted retention component 118 may have a loose stitch structure so that the plurality of protrusions 120 may extend through the loops of the stitches themselves. In further embodiments, the knitted retention component 118 may define a plurality of apertures 130 formed in the knitted retention component 118. These apertures 130 may be used to attach the knitted retention component 118 to the backing member 116 by extending each of the plurality of protrusions 120 through at least one corresponding aperture 130. The plurality of apertures 130 may be formed in the knitted retention component 118 during the knitting process or after the knitting process.

The knitted retention component 118 may be knit in one piece using at least one elastic yarn. Using at least one elastic yarn enables the knitted retention component 118 to stretch and have elastic properties. For example, the knitted retention component 118 may be stretched, to a variety of degrees, when the knitted retention component 118 is attached to the backing member 116. In some embodiments, the knitted retention component 118 remains in a stretched state while the knitted retention component 118 is attached to the backing member 116. This stretching of the knitted retention component 118 due to the attachment to backing member 116 causes a tension force to be created in the knitted retention component 118. Additionally, the material and structure of the backing member 116 is selected in order to withstand the tension force created in the knitted retention component 118 without substantial deformation of the backing member 116. The backing member 116 may provide structure to the assembled knit amenities panel 110.

Figure 1D:
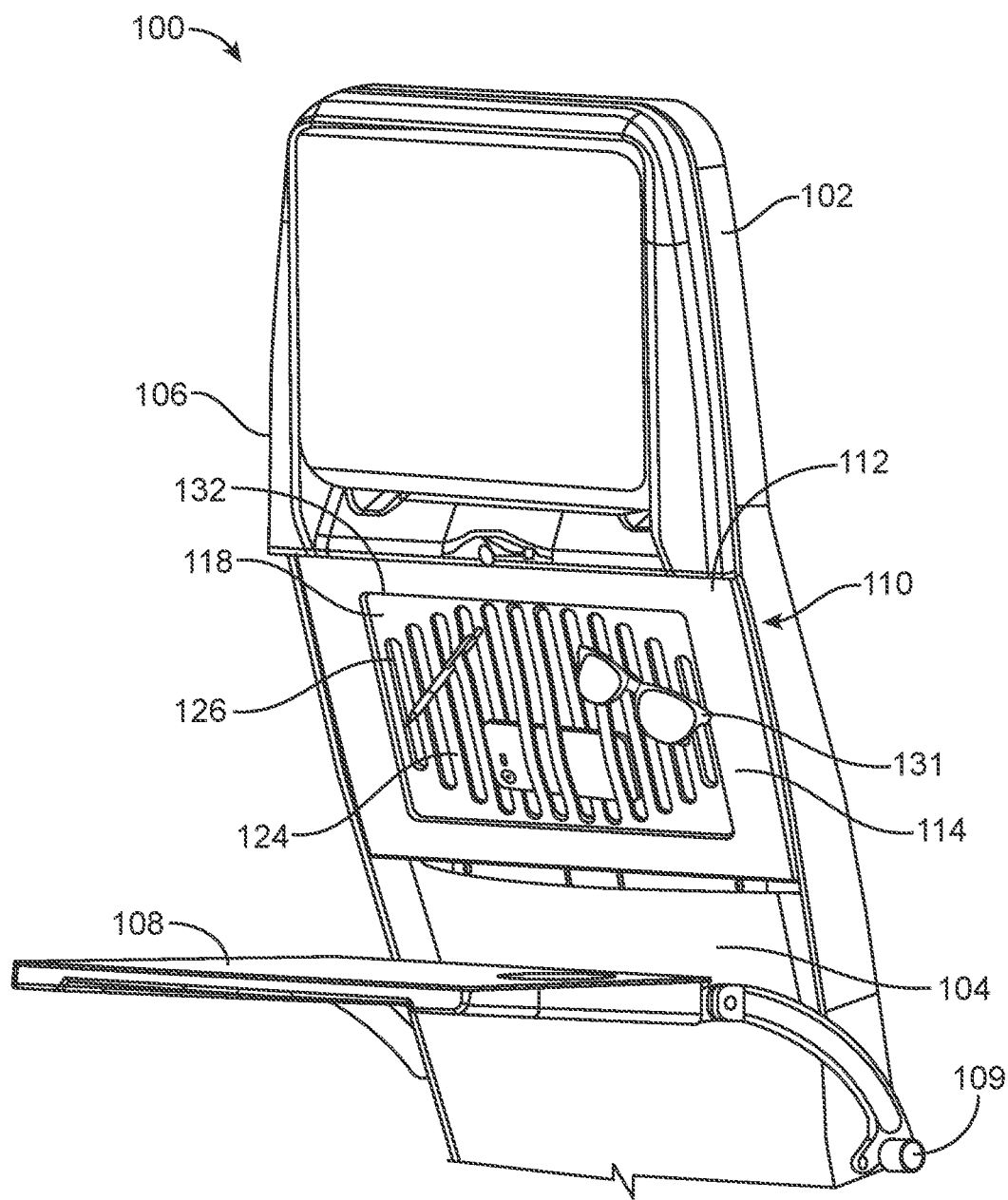
FIG. 1D is a perspective rear view of the seat of FIG. 1A with objects stored in the knit amenities panel.

Sections of the attached knitted retention component 118, such as at least one of retention portion 124, may be further stretched as those sections are lifted or pulled in a direction away from the backing member 116. An object 131 (e.g., a personal electronic device, such as a cell phone, a tablet, an e-reader, an MP3 player, a gaming system, etc., or other item, such as a pen, reading glasses, sunglasses, headphones, computer cords, charging cords, snack items, compact mirrors, etc.) may be placed at least partially behind at least one of the retention portions 124, as is best illustrated in FIG. 1D. The tension force created in the knitted retention component 118 permits the knitted retention component 118 to hold the object 131 in place. In some embodiments, the knitted retention component 118 holds the object 131 against the backing member 116.

At least one of the knitted retention component 118, the backing member 116, or an additional material component, if included in the knit amenities panel 110, may include a material and/or a coating that assists with gripping the object 131 to hold the object 131 in place. For example, a sticky or tacky material may be coated on the backing member 116.

Due to the intended nature of the use of the knit amenities panel 110, the knitted retention component 118 is designed and formed to withstand repetitive use without substantial permanent deformation to the knitted retention component 118 itself. For example, the materials and knit structure of the knitted retention component 118 may be selected to withstand at least 10,000 cycles, at least 20,000 cycles, at least 30,000 cycles, at least 35,000 cycles, at least 40,000 cycles, at least 45,000 cycles, or at least 50,000 cycles. The knitted retention component 118 may be stretched up to a maximum distance from the backing member 116. The maximum distance may range from 0.5 inch to 3 inches, 0.5 inch to 2 inches, from 0.5 inch to 1.5 inches, 0.5 inch to 1 inch, from 1 inch to 3 inches, from 1 inch to 2 inches, from 1 inch to 1.5 inches, from 1.5 inches to 3 inches, from 1.5 inches to 2 inches, or from 2 inches to 3 inches. In some embodiments, the maximum distance may be approximately 1.5 inches. The knitted retention component 118 may be configured to withstand a range from 1 lb. to 5 lbs., 1 lb. to 4 lbs., 1 lb. to 3 lbs., 1 lb. to 2.5 lbs., 1 lb. to 2 lbs., 2 lbs. to 5 lbs., 2 lbs. to 4 lbs., 2 lbs. to 3 lbs., 2 lbs. to 2.5 lbs., 2.5 lbs. to 5 lbs., 2.5 lbs. to 4 lbs., 2.5 lbs. to 3 lbs., 3 lbs. to 5 lbs., 3 lbs. to 4 lbs., or 4 lbs. to 5 lbs. force of axial tensile strength.

As discussed previously, the cover shroud member 114 may be attached to at least one of the backing member 116 or the knitted retention component 118. The cover shroud member 114 may also be integrally formed with the backing member 116. In some embodiments, the cover shroud member 114 defines an access opening 132. The access opening 132 may be centrally located on the cover shroud member 114, though it is understood that the access opening 132 may be located in any suitable location on the cover shroud member 114. Additionally, the access opening 132 may be any suitable shape, e.g., rectangular, square, circular, triangular, oval, etc. In some embodiments, the cover shroud member 114 may have a plurality of access openings 132. In some embodiments, the access opening 132 permits access to at least part of the knitted retention component 118.

The cover shroud member 114 may cover at least a portion of the knitted retention component 118 and the backing member 116. This may help to protect and maintain the knitted retention component 118 and the backing member 116. Additionally, the cover shroud member 114 may be used to provide the knit amenities panel 110 with a finished and clean appearance.

Figure 5:
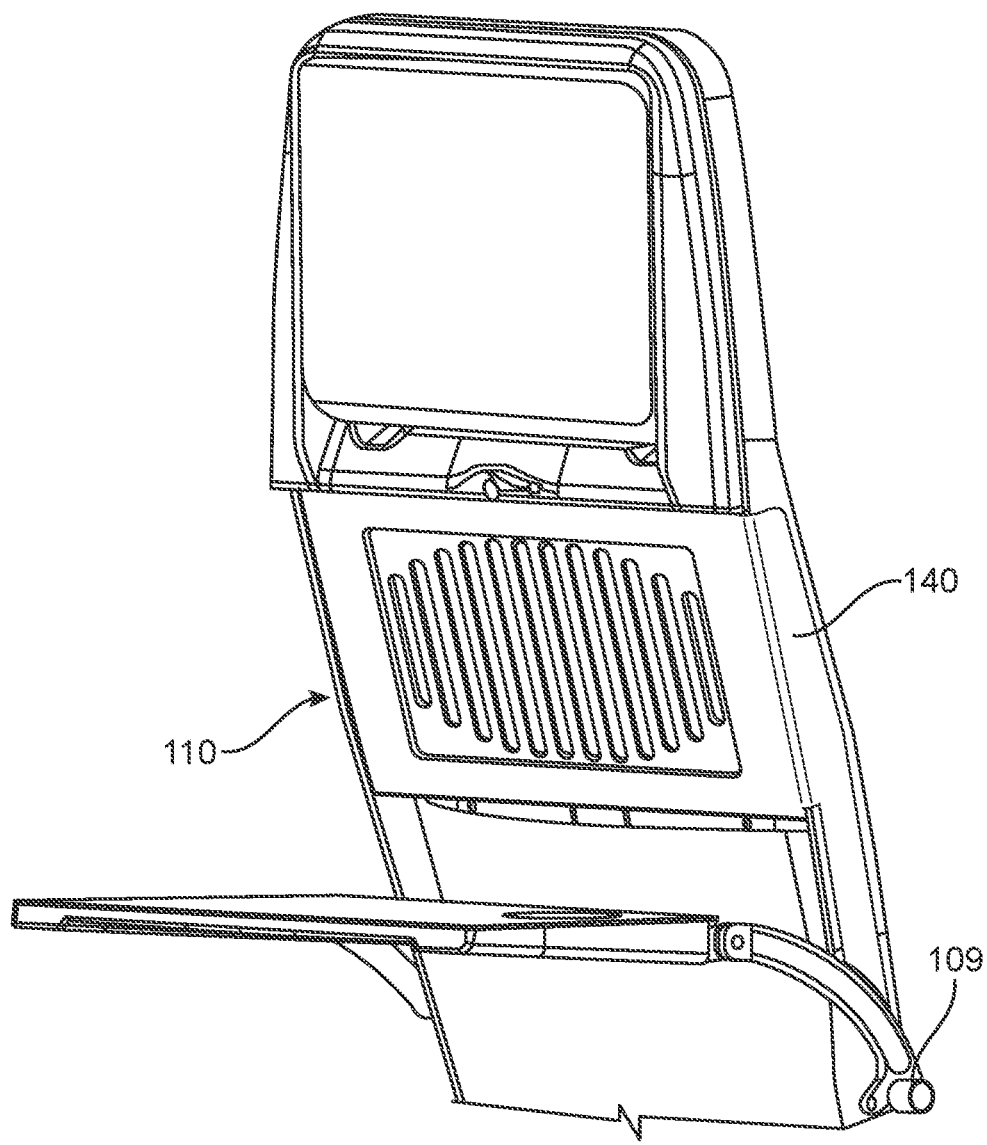
FIG. 5 is a perspective rear view of a seat with a knit amenities panel, according to certain embodiments of the present invention.

In some embodiments, the cover shroud member 114 may be used to attach the knit amenities panel 110 to the passenger seat 100. For example, the cover shroud member 114 may attach to at least one of a seat back 102, a rearward surface 104 of a seat back 102, a shroud portion 106, or a seat frame 109. The cover shroud member 114 may be attached to at least one of a seat back 102, a rearward surface 104 of a seat back 102, a shroud portion 106, or a seat frame 109 using at least one of a fastener (e.g., a nail, screw, bolt, etc.), an adhesive, etc. In some embodiments, as best illustrated in FIG. 5, the knit amenities panel 110 may include an attachment member 140 configured to attach the knit amenities panel 110 to the passenger seat 100. For example, the attachment member 140 may be coupled to the seat frame 109. Additionally, the cover shroud member 114 may be part of or integrally formed with the shroud portion 106 so that the knitted retention component 118 and the backing member 116 may be attached to the shroud portion 106.

The knit amenities panel 110 may be positioned along the passenger seat at any suitable location. For example, the knit amenities panel 110 may be positioned on the rearward surface 104 of the seat back 102 so that the knit amenities panel 110 is located at least partially between the tray table 108 and the rearward surface 104 when the tray table 108 is in a stowed position. Further, the knit amenities panel 110 may be located above or below the tray table 108 when the tray table 108 is in a stowed position, or the knit amenities panel 110 may extend out from a side surface of the seat back 102.

Figure 2:
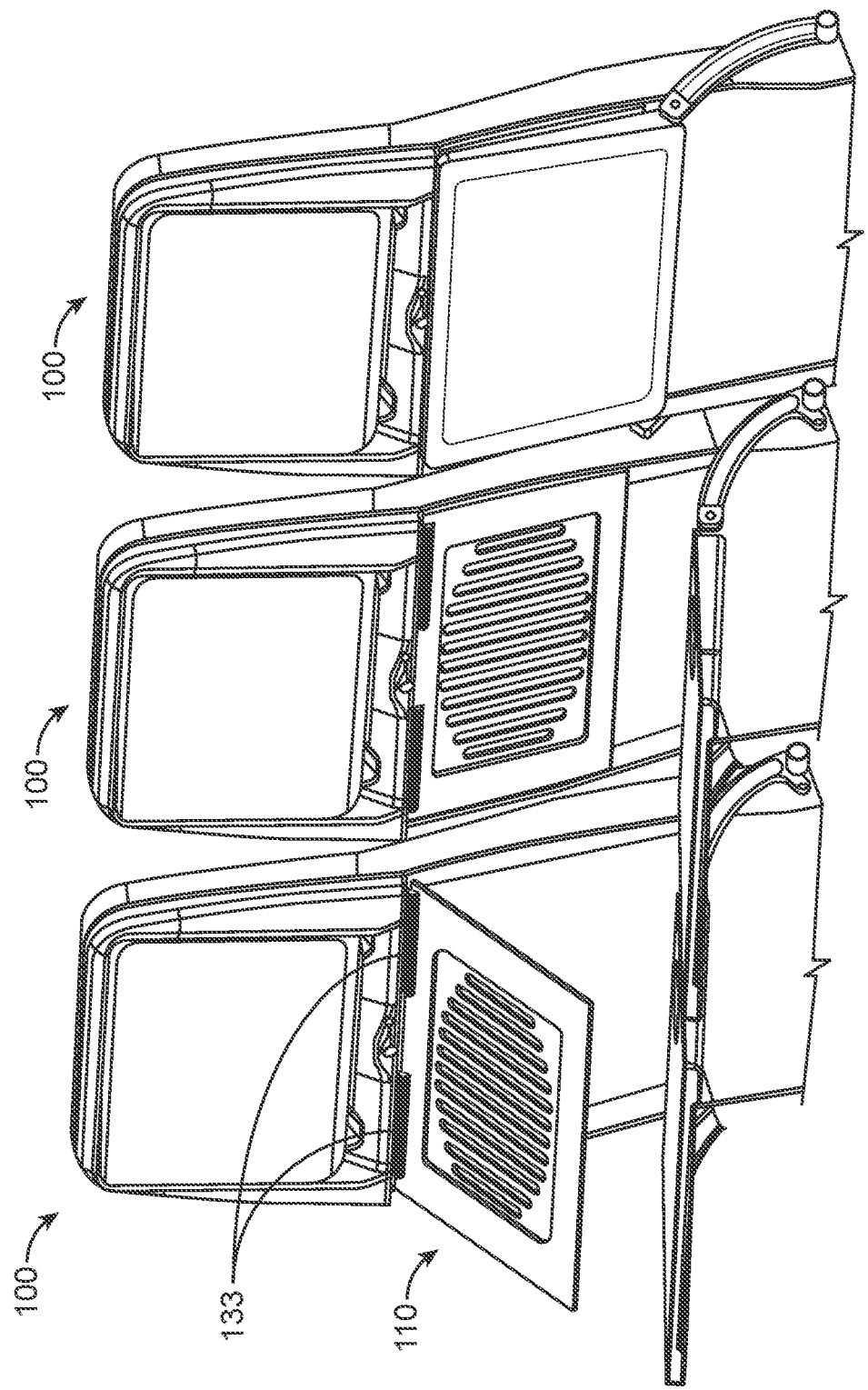
FIG. 2 is a perspective rear view of a row of seats each with a pivotable knit amenities panel, according to certain embodiments of the present invention.

In some embodiments, as best illustrated in FIG. 2, the knit amenities panel 110 may be pivotally coupled to the passenger seat 100 using at least one pivot member 133. This may permit a passenger to adjust the angle of the knit amenities panel 110 relative to the passenger seat 100. The at least one pivot member 133 may provide a means to maintain the knit amenities panel 110 in a desired position until it is re-positioned. For example, the at least one pivot member 133 may allow the knit amenities panel 110 to be adjusted to any suitable angle relative to the passenger seat 100 ranging from 1 degrees to 180 degrees. As non-limiting examples, the at least one pivot member 133 may be or include a hinge, a ball and socket connection, or any other suitable connection that permits rotational movement.

Figure 3A:
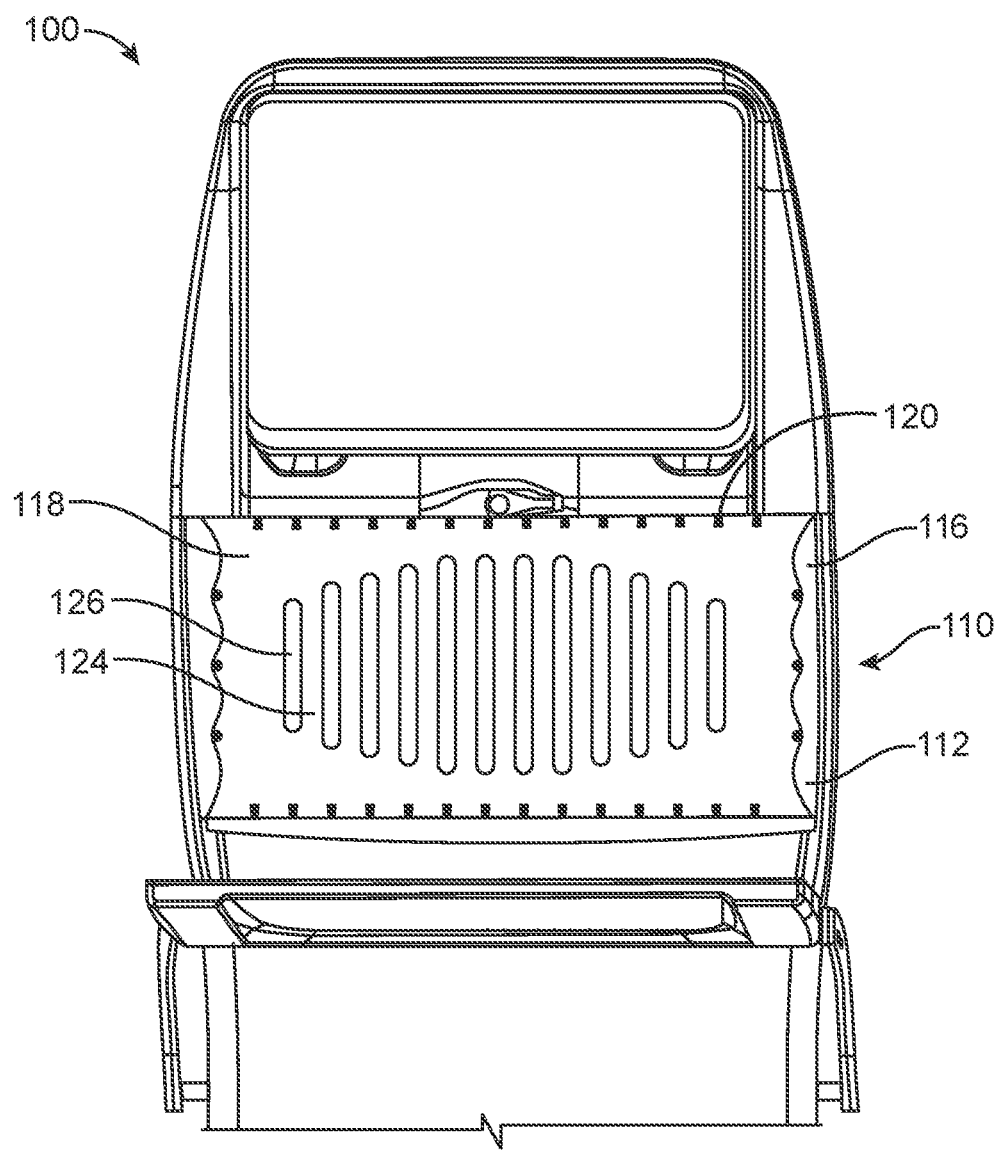
FIG. 3A is a rear view of a seat with a knit amenities panel, according to certain embodiments of the present invention.
Figure 3B:
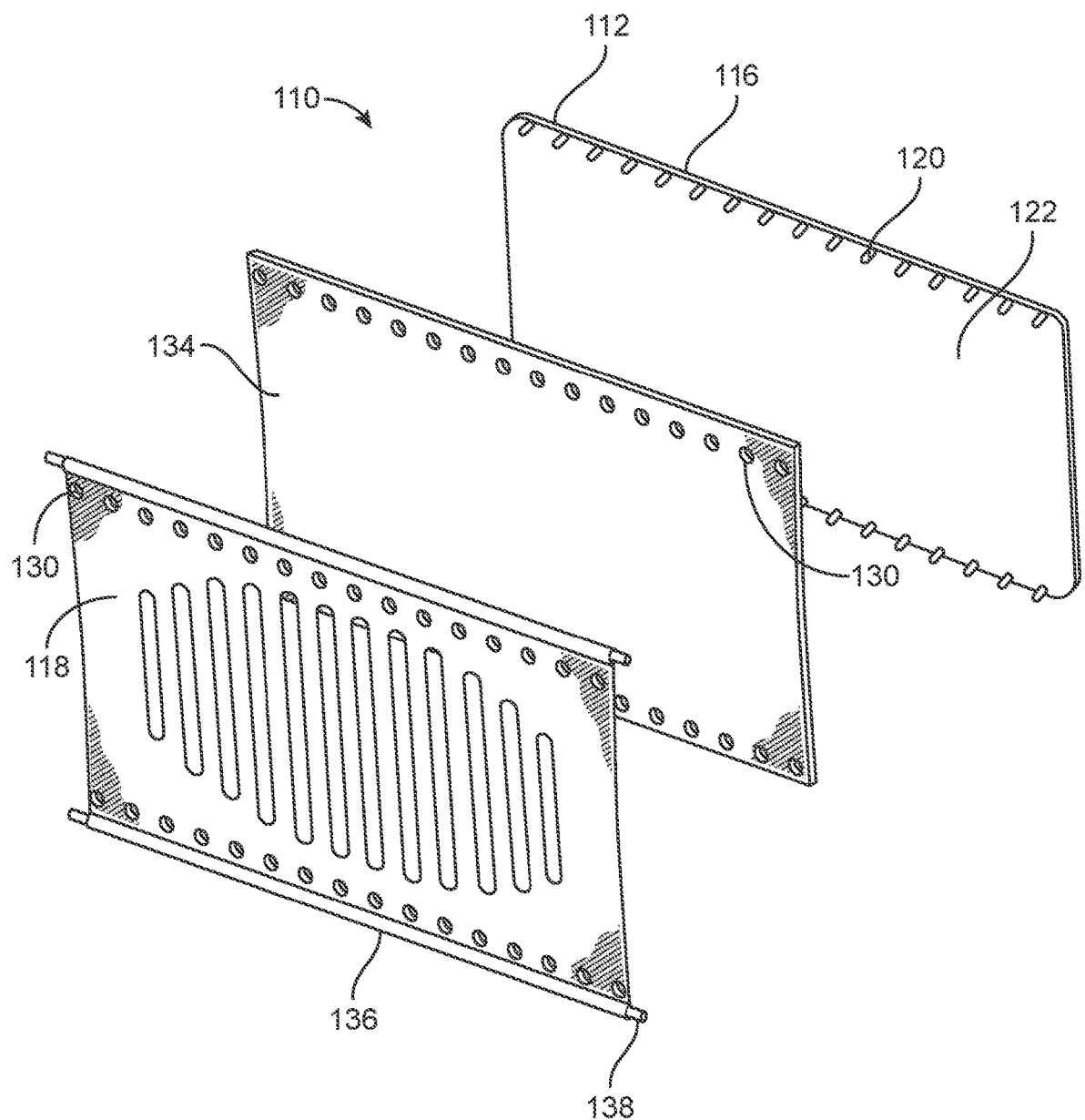
FIG. 3B is an isolated, exploded view of the knit amenities panel of the seat of FIG. 3A.
Figure 4B:
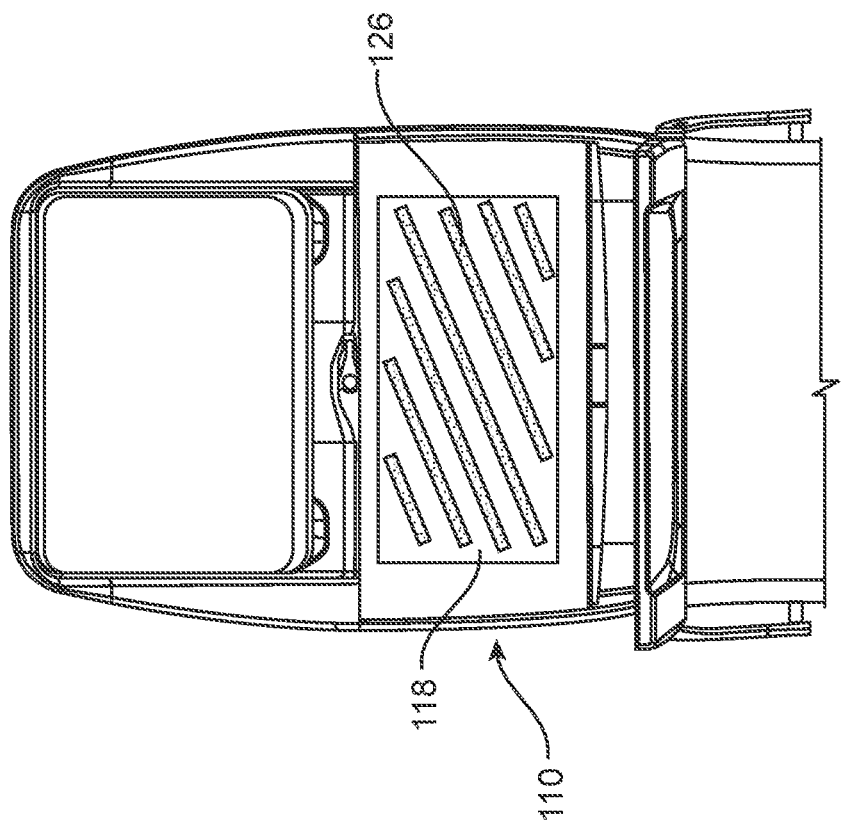
FIGS. 4B-4D are a rear view of the seat of FIG. 4A with an alternative design of the knitted retention component.
Figure 4A:
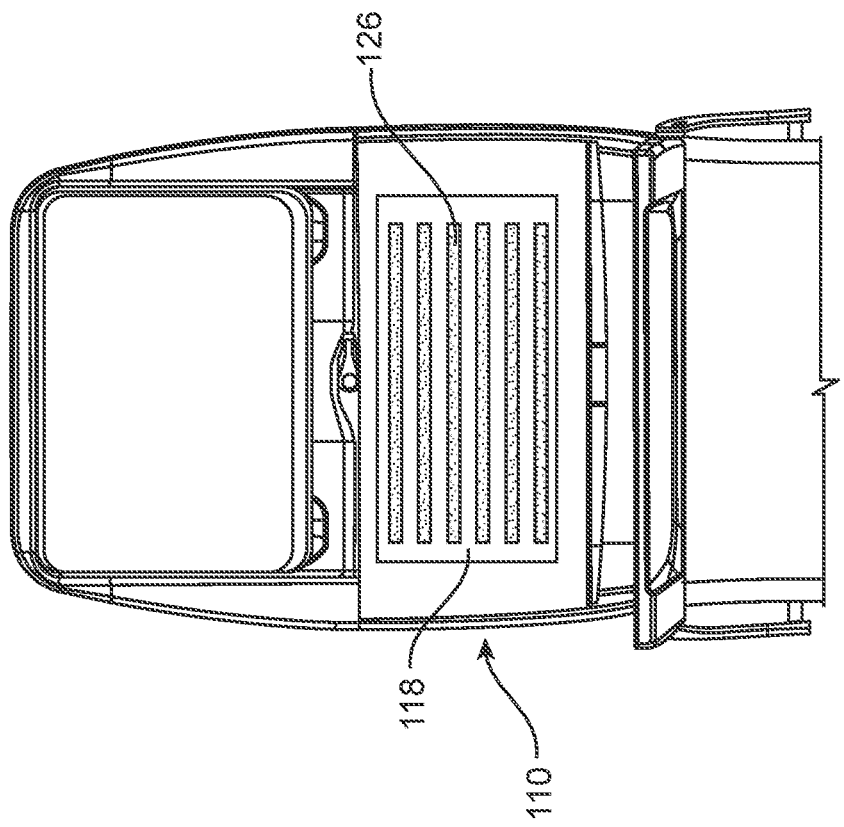
FIG. 4A is a rear view of a seat with a knit amenities panel, according to certain embodiments of the present invention.
Figure 4D:
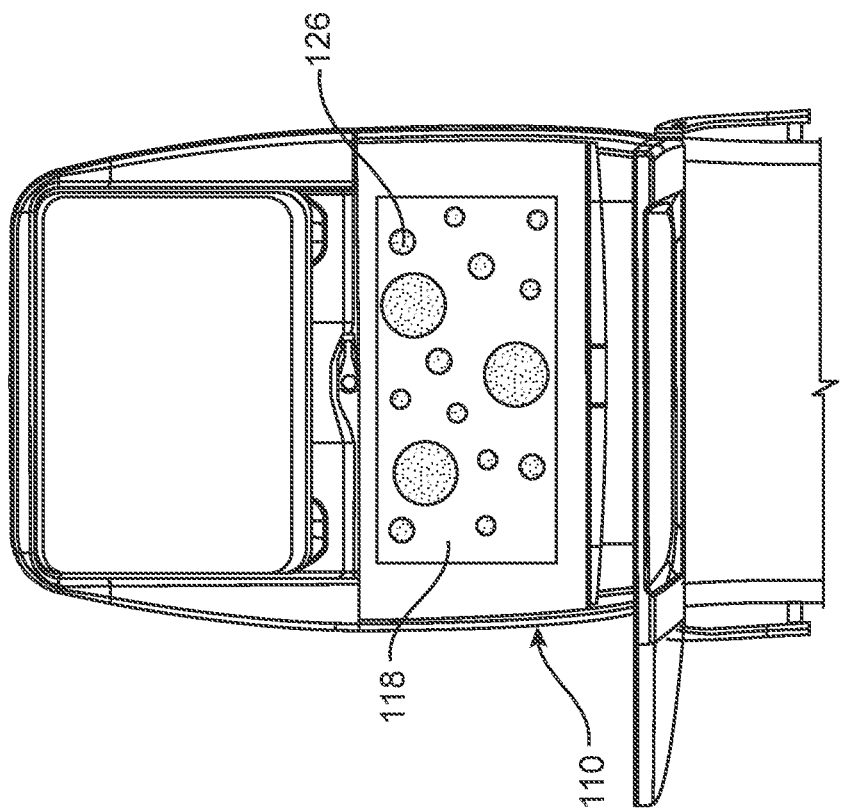
Figure 4C:
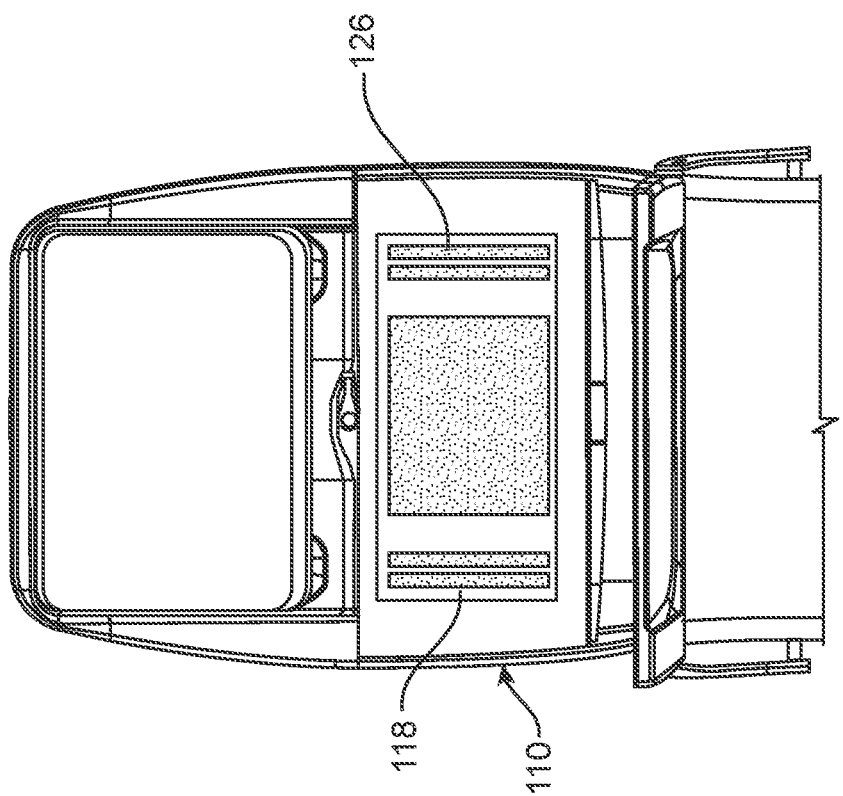

In some embodiments, as best illustrated in FIGS. 3A and 3B, the knit amenities panel 110 may be formed with a knitted retention component 118, a material component 134, and without a cover shroud member 114 so that the backing member 116 forms the support structure 112. Thus, the support structure 112 may include all of the features of the backing member 116 described in this application. Additionally, the knit amenities panel 110 may be coupled to the passenger seat 100 using the support structure 112.

The material component 134 may be formed from a material that helps to protect the objects 131 when stored using the knit amenities panel 110. For example, the material component 134 may be formed from at least one of a knit material, a woven material, a cotton material, a polyester material, a microfiber material, a wool material, a leather material, a nylon material, a spandex material, a sponge-type material, a cushioning material, or any other suitable material. In some embodiments, additional material components may be incorporated into the knit amenities panel 110 to add additional cushioning to the knit amenities panel 110. In some embodiments, the material component 134 may be coated with a material to help grip the objects 131 when stored using the knit amenities panel 110. The material component 134 may also define a plurality of apertures 130.

A knitted material component 134 may be formed using any of the knitting techniques or materials described in this application. In some embodiments, the knitted retention component 118 and the knitted material component 134 may be formed separately. In further embodiments, the knitted retention component 118 and the knitted material component 134 may be formed in one piece so that each of the knitted retention component 118 and the knitted material component 134 form at least one layer of a single knit material.

The knitted retention component 118 and the material component 134 may be attached to the support structure 112 using the plurality of protrusions 120 or using an adhesive or melt yarn as discussed below in reference to FIG. 6. In some embodiments, the material component 134 may be attached between the knitted retention component 118 and the support structure 112 when the knitted retention component 118 and the material component 134 are attached to the support structure 112. Thus the material component 134 may come into contact with the retention surface 122.

Additionally, at least one channel 136 may be formed in the knitted retention component 118. In some embodiments, the at least one channel 136 may be formed during the knitting process of the knitted retention component 118. The at least one channel 136 may be sized so that a rod 138 may be inserted into and extend through at least part of the at least one channel 136. The rod 138 may assist with creating the tension force in the knitted retention component 118 when the knitted retention component 118 is attached to the support structure 112. For example, the rod 138 may enable a uniform tension to be created along the length of the knitted retention component 118.

In some embodiments, the location of the plurality of protrusions 120 along the support structure 112 may also assist with creating the tension force in the knitted retention component 118. For example, as best illustrated in FIG. 3A, the plurality of protrusions 120 may be uniformly spaced along the support structure 112. This may assist with creating a uniform tension along the length of the knitted retention component 118. Additionally, at least one protrusion 120 may substantially align with the longitudinal axis of at least one opening 126 of the attached knitted retention component 118. This may also assist with creating a uniform tension along the length of the knitted retention component 118.

In some embodiments, as best illustrated in FIGS. 4A-4D, the plurality of openings 126 of the knitted retention component 118 may form any suitable pattern or design in the knitted retention component 118. For example, the plurality of openings 126 may extend horizontally or diagonally, the size and/or spacing between each of the plurality of openings 126 may differ, the plurality of openings 126 may be any suitable shape (e.g., rectangular, square, triangular, circular, oval, etc.), etc.

As previously discussed, and as best illustrated in FIG. 6, the backing member 116 may define a cavity 128. The cavity 128 may permit larger objects 131 to be stored using the knit amenities panel 110. In some embodiments, the backing member 116 may be formed without any protrusions. The knitted retention component 118 may be attached using an adhesive or any other suitable form of attachment. Additionally, the knitted retention component 118 may be formed using a melt or similar type of yarn so that the knitted retention component 118 may be attached to the backing member 116 by melting at least a portion of the knitted retention component 118 to the backing member 116.

Elements of any of the embodiments discussed above may be fully interchangeable with one another. In the following, further examples are described to facilitate the understanding of the invention (and in some aspects, features of an apparatus or system described in one or more of these examples can be utilized in a method described in one of the other examples or vice versa):

Example 1. A passenger seat (which may incorporate features of any of the subsequent examples) comprising a knit amenities panel, wherein the knit amenities panel comprises: a support structure comprising a cover shroud member and a backing member; and a knitted retention component comprising at least one elastic yarn, wherein: the knitted retention component is knitted in one piece; the knitted retention component is attachable to the backing member and defines a plurality of openings; a tension force is created in the knitted retention component due to the attachment of the knitted retention component to the backing member; the tension force permits the knitted retention component to hold at least one object; and the backing member with the knitted retention component attached is coupled to the cover shroud member.

Example 2. The passenger seat of Example 1 or any of the preceding or subsequent examples, wherein the cover shroud member defines an opening that permits access to the knitted retention component.

Example 3. The passenger seat of Example 1 or any of the preceding or subsequent examples, wherein the cover shroud member is attachable to at least one of a seat frame of the passenger seat, a shroud portion of the passenger seat, or a seat back of the passenger seat.

Example 4. The passenger seat of Example 1 or any of the preceding or subsequent examples, wherein the knitted retention component is configured to hold the at least one object against the backing member.

Example 5. The passenger seat of Example 1 or any of the preceding or subsequent examples, wherein the backing member comprises a plurality of protrusions and the knitted retention component is attached to the backing member using the plurality of protrusions.

Example 6. The passenger seat of Example 5 or any of the preceding or subsequent examples, wherein at least one of the plurality of protrusions substantially aligns with each of the plurality of openings to provide the tension force.

Example 7. The passenger seat of Example 5 or any of the preceding or subsequent examples, wherein the knitted retention component comprises a plurality of edges and the plurality of protrusions extend along each of the plurality of edges.

Example 8. A passenger seat (which may incorporate features of any of the preceding or subsequent examples) comprising a knit amenities panel, wherein the knit amenities panel comprises: a support structure; and a knitted retention component comprising at least one elastic yarn, wherein: the knitted retention component is knitted in one piece; the knitted retention component is attachable to the support structure and defines a plurality of openings; a tension force is created in the knitted retention component due to the attachment of the knitted retention component to the support structure; and the tension force permits the knitted retention component to hold at least one object.

Example 9. The passenger seat of Example 8 or any of the preceding or subsequent examples, wherein the support structure defines a cavity and the knitted retention component substantially encloses the cavity.

Example 10. The passenger seat of Example 8 or any of the preceding or subsequent examples, wherein the support structure is attachable to at least one of a seat frame of the passenger seat, a shroud portion of the passenger seat, or a seat back of the passenger seat.

Example 11. The passenger seat of Example 10 or any of the preceding or subsequent examples, wherein the attached support structure is positioned between the knitted retention component and the seat back of the passenger seat.

Example 12. The passenger seat of Example 8 or any of the preceding or subsequent examples, wherein the knitted retention component is configured to hold the at least one object against the support structure.

Example 13. The passenger seat of Example 8 or any of the preceding or subsequent examples, wherein the support structure comprises a plurality of protrusions and the knitted retention component is attached to the support structure using the plurality of protrusions.

Example 14. The passenger seat of Example 13 or any of the preceding or subsequent examples, wherein at least one of the plurality of protrusions substantially aligns with at least one of the plurality of openings to provide the tension force.

Example 15. A passenger seat (which may incorporate features of any of the preceding or subsequent examples) comprising: a seat back; and a knit amenities panel positioned proximate to the seat back, the knit amenities panel comprising: a support structure; and a knitted retention component comprising at least one elastic yarn, wherein: the knitted retention component is knitted in one piece; the knitted retention component is attachable to the support structure and defines a plurality of openings; a tension force is created in the knitted retention component due to the attachment of the knitted retention component to the support structure; and the tension force permits the knitted retention component to hold at least one object.

Example 16. The passenger seat of Example 15 or any of the preceding or subsequent examples, wherein the knit amenities panel is pivotally attachable to the passenger seat.

Example 17. The passenger seat of Example 15 or any of the preceding or subsequent examples, wherein the support structure is attachable to at least one of a seat frame of the passenger seat, a shroud portion of the passenger seat, or the seat back.

Example 18. The passenger seat of Example 17 or any of the preceding or subsequent examples, wherein the attached support structure is positioned between the knitted retention component and the seat back of the passenger seat.

Example 19. The passenger seat of Example 15 or any of the preceding or subsequent examples, further comprising a tray table deployable away from a rearward surface of the seat back, wherein the knit amenities panel is attachable to the passenger seat and positioned between the rearward surface of the seat back and the tray table when the tray table is in a stowed position.

Example 20. The passenger seat of Example 15 or any of the preceding examples, wherein the knitted retention component is configured to hold the at least one object against the support structure.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat comprising a knit amenities panel, wherein the knit amenities panel comprises:
   a support structure comprising a cover shroud member defining an opening and a backing member including a knitted material component; and
   a knitted retention component comprising at least one elastic yarn, wherein:
      the knitted retention component is knitted in one piece;
      the knitted retention component is attachable to the backing member and defines a plurality of openings through which the knitted material component is accessible;
      a tension force is created in the knitted retention component due to attachment of the knitted retention component to the backing member;
      the tension force permits the knitted retention component to hold at least one object; and
      the backing member with the knitted retention component attached is coupled to the cover shroud member such that the knitted retention component is located between the backing member including the knitted material component and the cover shroud member, and the knitted retention component is accessible through the opening of the cover shroud member.

2. The passenger seat of claim 1, wherein the knitted material component and the knitted retention component are formed from one piece of material.

3. The passenger seat of claim 1, wherein the cover shroud member is attachable to at least one of a seat frame of the passenger seat, a shroud portion of the passenger seat, or a seat back of the passenger seat.

4. The passenger seat of claim 1, wherein the knitted retention component is configured to hold the at least one object against the backing member.

5. The passenger seat of claim 1, wherein the backing member comprises a plurality of protrusions and the knitted retention component is attached to the backing member using the plurality of protrusions.

6. The passenger seat of claim 5, wherein at least one of the plurality of protrusions substantially aligns with each of the plurality of openings to provide the tension force.

7. The passenger seat of claim 5, wherein the knitted retention component comprises a plurality of edges and the plurality of protrusions extend along each of the plurality of edges.

8. A passenger seat comprising a knit amenities panel, wherein the knit amenities panel comprises:
   a support structure;
   at least one member defining an opening;
   a knitted material component coupled to the support structure; and
   a knitted retention component comprising at least one elastic yarn, wherein:
      the knitted retention component is knitted in one piece;
      the knitted retention component is attachable to the support structure and defines a plurality of openings through which access to the knitted material component is accessible;
      a tension force is created in the knitted retention component due to attachment of the knitted retention component to the support structure; and
      the tension force permits the knitted retention component to hold at least one object; and
      the support structure is attachable to the at least one member such that the knitted retention component is located between the knitted material component and the at least one member, and the knitted retention component is accessible through the opening of the at least one member.

9. The passenger seat of claim 8, wherein the support structure defines a cavity and the knitted retention component substantially encloses the cavity.

10. The passenger seat of claim 8, wherein the support structure is attachable to at least one of a seat frame of the passenger seat, a shroud portion of the passenger seat, or a seat back of the passenger seat.

11. The passenger seat of claim 10, wherein the support structure attached to at least one of the seat frame, the shroud portion, or the seat back is positioned between the knitted retention component and the seat back of the passenger seat.

12. The passenger seat of claim 8, wherein the knitted retention component is configured to hold the at least one object against the support structure and the knitted material component.

13. The passenger seat of claim 8, wherein the support structure comprises a plurality of protrusions and the knitted retention component is attached to the support structure using the plurality of protrusions.

14. The passenger seat of claim 13, wherein at least one of the plurality of protrusions substantially aligns with at least one of the plurality of openings to provide the tension force.

15. A passenger seat comprising:
 a seat back; and
 a knit amenities panel positioned proximate to the seat back, the knit amenities panel comprising:
  a support structure comprising a cover shroud member defining an opening and a backing member including a knitted material component; and
  a knitted retention component comprising at least one elastic yarn, wherein:
   the knitted retention component is knitted in one piece;
   the knitted retention component is attachable to the backing member and defines a plurality of openings through which access to the knitted material component is accessible;
   a tension force is created in the knitted retention component due to attachment of the knitted retention component to the support structure;
   the tension force permits the knitted retention component to hold at least one object; and
   the backing member with the knitted retention component attached is coupled to the cover shroud member such that the knitted retention component is located between the backing member including the knitted material component and the cover shroud member, and the knitted retention component is accessible through the opening of the cover shroud member.

16. The passenger seat of claim 15, wherein the knit amenities panel is pivotally attachable to the passenger seat.

17. The passenger seat of claim 15, wherein the support structure is attachable to at least one of a seat frame of the passenger seat, a shroud portion of the passenger seat, or the seat back.

18. The passenger seat of claim 17, wherein the support structure attached to at least one of the seat frame, the shroud portion, or the seat back is positioned between the knitted retention component and the seat back of the passenger seat.

19. The passenger seat of claim 15, further comprising a tray table deployable away from a rearward surface of the seat back, wherein the knit amenities panel is attachable to the passenger seat and positioned between the rearward surface of the seat back and the tray table when the tray table is in a stowed position.

20. The passenger seat of claim 15, wherein the knitted retention component is configured to hold the at least one object against the support structure.

\* \* \* \* \*